US010366582B2

(12) United States Patent
Kurian (10) Patent No.: US 10,366,582 B2
(45) Date of Patent: Jul. 30, 2019

(54) DEVICES AND SYSTEMS FOR DETECTING UNAUTHORIZED COMMUNICATION OF DATA FROM A MAGNETIC STRIPE DEVICE OR EMBEDDED SMART CHIP DEVICE

(71) Applicant: Bank of America Corporation, Charlotte, NC (US)

(72) Inventor: Manu Jacob Kurian, Dallas, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 445 days.

(21) Appl. No.: 15/188,659

(22) Filed: Jun. 21, 2016

(65) Prior Publication Data

US 2017/0365134 A1 Dec. 21, 2017

(51) Int. Cl.
| | |
|---|---|
| *G07F 19/00* | (2006.01) |
| *G06Q 20/40* | (2012.01) |
| *G06Q 20/34* | (2012.01) |
| *G06K 19/06* | (2006.01) |
| *H04W 4/80* | (2018.01) |
| *G06K 19/073* | (2006.01) |

(52) U.S. Cl.
CPC ... *G07F 19/2055* (2013.01); *G06K 19/06187* (2013.01); *G06K 19/07309* (2013.01); *G06Q 20/341* (2013.01); *G06Q 20/3437* (2013.01); *G06Q 20/3563* (2013.01); *G06Q 20/405* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 7,671,756 B2 | 3/2010 | Herz et al. | |
| 7,674,298 B1 | 3/2010 | Cambridge | |
| 7,769,394 B1 | 8/2010 | Zhu | |
| 7,925,022 B2 | 4/2011 | Jung et al. | |
| 8,045,961 B2 | 10/2011 | Ayed et al. | |
| 8,396,458 B2 | 3/2013 | Raleigh | |
| 9,430,730 B2* | 8/2016 | Chatterton | G06F 21/77 |
| 2002/0043566 A1* | 4/2002 | Goodman | G06Q 20/341 |
| | | | 235/492 |
| 2005/0186954 A1 | 8/2005 | Kenney | |
| 2006/0117197 A1 | 6/2006 | Nurmi | |
| 2007/0155418 A1 | 7/2007 | Shau et al. | |
| 2008/0034221 A1* | 2/2008 | Hammad | G06Q 20/085 |
| | | | 713/190 |
| 2008/0216001 A1 | 9/2008 | Ording et al. | |
| 2009/0096573 A1 | 4/2009 | Graessley | |
| 2009/0145964 A1* | 6/2009 | Blythe | G06K 19/06187 |
| | | | 235/380 |

(Continued)

*Primary Examiner* — Christopher Bridges
(74) *Attorney, Agent, or Firm* — Michael A. Springs; Moore & Van Allen PLLC; James C. Edwards (57) ABSTRACT

Disclosed are devices, systems and the like for determining unauthorized communication of data from a card device equipped with a magnetic stripe and/or smart chip. The card device is able to count by recording the number of instances in which the card device has either been swiped at a magnetic card reader or communicated data via an embedded Integrated Circuit (IC). In specific embodiments, the device is further configured to differentiate between authorized swipes/data communications and unauthorized data communications.

15 Claims, 3 Drawing Sheets

(56) References Cited

U.S. PATENT DOCUMENTS

| | | | |
|---|---|---|---|
| 2009/0152363 A1* | 6/2009 | Kim | G06K 19/07336 |
| | | | 235/492 |
| 2009/0187676 A1 | 7/2009 | Griffin et al. | |
| 2011/0034208 A1 | 2/2011 | Gu et al. | |
| 2011/0130170 A1 | 6/2011 | Han et al. | |
| 2011/0148752 A1 | 6/2011 | Alameh et al. | |
| 2011/0169654 A1 | 7/2011 | Ketari | |
| 2011/0313922 A1 | 12/2011 | Ben Ayed | |
| 2012/0019361 A1 | 1/2012 | Ben Ayed | |
| 2012/0019379 A1 | 1/2012 | Ben Ayed | |
| 2012/0052793 A1 | 3/2012 | Brisebois et al. | |
| 2013/0139218 A1 | 5/2013 | Roulland et al. | |
| 2014/0066046 A1 | 3/2014 | Keshavdas et al. | |
| 2014/0370807 A1 | 12/2014 | Lei et al. | |
| 2015/0178732 A1 | 6/2015 | Laracey | |
| 2016/0147300 A1 | 5/2016 | Liao et al. | |
| 2016/0163177 A1 | 6/2016 | Klicpera | |
| 2016/0197934 A1 | 7/2016 | Muraoka et al. | |
| 2017/0109728 A1* | 4/2017 | Zarakas | G06Q 20/341 |

\* cited by examiner

DEVICES AND SYSTEMS FOR DETECTING UNAUTHORIZED COMMUNICATION OF DATA FROM A MAGNETIC STRIPE DEVICE OR EMBEDDED SMART CHIP DEVICE

FIELD OF THE INVENTION

The present invention relates to data communication and, more specifically, counting and recording at a card device each instance in which the magnetic stripe of such a device is swiped or the data associated with an embedded integrated circuit in the device is read and, in specific embodiments, differentiating between authorized swipes/readings and unauthorized swipes/readings.

BACKGROUND

Card devices, otherwise referred to herein as card-like devices, store information via (i) a magnetic stripe located on a facing of the card device and/or (ii) memory associated with an embedded integrated circuit (i.e., a so-called smart card device). The information stored on such card devices is typically information that is deemed to be confidential information, such as user information, account information or the like.

Wrong-doers can readily capture the information stored on card devices by employing card skimming devices, which are unauthorized devices that merely capture the data and do not further transmit the data for an authorized purpose. Once the information has been captured, the wrong-doers may seek to create unauthorized duplicate card devices or the like. The possibility of having a card read by a card skimming device, increases when a user of the card device is no longer in possession of the card device (e.g., when a user provides the card device to a waiter at a restaurant for making payment and the waiter conducts the payment transaction out-of-sight of the user). In such instances, a wrong-doer in possession of the card device absent the user, may have the card device read via a valid authorized card reader (i.e., a point-of-sale terminal authorized to conduct payment transactions) and additionally may subject the card to one or more unauthorized card skimming devices. Once the card is returned to the user, the user has no way of determining that the card device has been subjected to the unauthorized card skimming devices.

Therefore, a need exists to allow for a user to determine unauthorized reading of data from a card device. In this regard, the desired devices, systems and the like should allow for the user to not only be aware of the number of times that a card device has been read (i.e., swiping of the magnetic stripe or communicating data from a smart chip card device) but also whether the readings are authorized or unauthorized readings. In addition, the desired invention should provide for numerous ways by which the user can be notified and/or made aware of the number of instances in which the card has been swiped at a magnetic stripe reader or communicated data via the smart chip (embedded integrated circuit (IC)) and, in specific embodiments, means by which the card may be deactivated in response to determining a prescribed number of instances of swiping the card device at a magnetic stripe reader or communicated data via the embedded IC of a smart card device.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing devices, systems and computer program products for determining unauthorized communication of data from a card device. In this regard, according to the present invention, the card device is able to count and record the number of instances in which a card device has either been swiped at a magnetic card reader or communicated data via an embedded Integrated Circuit (IC) (i.e., a smart card device) and, in specific embodiments of the invention, differentiate between authorized swipes/data communications and unauthorized data communications.

In specific embodiments of the invention, card devices equipped with an embedded IC device are able to detect instances in which data is read from the device (i.e., either instances in which the card is swiped or instances in which the card comes in contact with an electromagnetic field or short-range wireless communication field so as to prompt a wireless communication protocol. In other embodiments of the invention, the card device may be equipped with sensors that detect each instance that the card device has been swiped, or is inserted into a smart card reader.

In specific embodiments of the invention, the card device may be equipped with a display that is configured to display the count of instances in which the card device has either been swiped at a magnetic card reader or communicated data via the embedded IC. In other instances, the card device may implement short-range wireless communication, such as Near Field Communication (NFC) or the like, to communicate the count to a mobile communication device application that is configured to display the count to the user via the mobile communication device. In other embodiments of the invention, the recorded count may be read, in response to the card device being presented at an Automated Teller Machine (ATM) or other card reading kiosk and the count displayed at the ATM and/or kiosk.

In further embodiments of the invention the card device is configured to differentiate between authorized/legitimate readings of data from the card device and unauthorized readings of data from the card device. In specific embodiment of the invention, such differentiation is accomplished by communicating from the authorized reading device a registered identification (i.e., fingerprint) at the time of the reading of the data that is stored in unison with the count information (e.g., time, location, and the like) associated with the reading of the data. In such embodiment, data being read by unregistered reading devices are deemed to be unauthorized readings of the data.

In additional embodiments of the invention, in which a predetermined number of counts have been recorded and, in some embodiments, over a predetermined time period, an alert may be electronically communicated to the user of the card device or the card device may be deactivated for a prescribed period of time or until further action is taken to re-activate the card device.

A device configured for detecting unauthorized communication of data from the device defines first embodiments of the invention. The device includes a card-like body and at least one of (i) a magnetic stripe, disposed on a facing of the card-like body, configured to store first data or (ii) an integrated circuit, embedded within the card-like body, having corresponding memory configured to store second data. The card device is configured to count by recording each instance of reading the first data from the magnetic stripe or communicating the second data from the memory. The first data and the second data may, according to specific embodiments of the device, be the same data or, in other embodiments, the first and second data may be different data.

In specific embodiments of the device, at least one of the magnetic stripe or the memory is configured to count by recording each instance of reading the first data from the magnetic stripe.

In other specific embodiments of the device, the integrated circuit is configured to count by recording each instance of the device coming into contact with an electromagnetic field and initiating a wireless communication protocol to communicate the second data from the memory.

In still further embodiments of the device, the integrated circuit is configured to count by recording each instance of the device coming into contact with a short-range wireless communication reader and initiating a short range wireless communication protocol to communicate the second data from the memory.

In further embodiments the device includes at least one sensor configured to sense at least one of swiping the magnetic stripe in a magnetic swipe reader or inserting at least a portion of the device into a reader terminal configured for reading the second data from the memory. In such embodiments of the invention, the sensor includes at least one of an accelerometer, a gyroscope, a pressure sensor and a light sensor. In specific related embodiments the device includes a swipe detection routine stored in the memory and executable by the integrated circuit. The routine is configured to detect that the magnetic stripe has been swiped by implementing one or more of (i) the accelerometer to determine a requisite level of acceleration associated with swiping, (ii) the gyroscope to determine proper swipe orientation of the device based on location of the magnetic stripe on the device, (iii) the pressure sensor to determine a requisite pressure at the magnetic stripe associated with swiping the device thru a magnetic stripe reader, and (iv) the light sensor to determine a requisite level of light encountered by the device while being swiped thru a magnetic stripe reader. In other specific embodiments the device includes an insertion detection routine stored in the memory and executable by the integrated circuit. The routine is configured to detect that the device has been inserted into a reader terminal by implementing one or more of (i) the gyroscope to determine proper insertion orientation of the device into the reader terminal based on location of the integrated circuit, (ii) the pressure sensor to determine a requisite pressure applied to the device while inserted into the reader terminal, and (iv) the light sensor to determine a requisite level of light encountered by the device for a predetermined period of time while inserted into the reader terminal.

In still further specific embodiments the device includes a display, disposed on a facing of the card-like body, configured to display a number of the instances of at least one of reading the first data from the magnetic stripe or communicating the second data from the memory.

Moreover, in additional specific embodiments the device includes at least one short-range wireless communication mechanism. The short-range wireless communication mechanism is configured to communicate, to a mobile communication terminal, a number of the instances of at least one of reading the first data from the magnetic stripe or communicating the second data from the memory. In related embodiments the device is configured to, upon being inserted into an Automated Teller Machine (ATM), be read, from the magnetic stripe or the memory, the number of the instances of at least one of reading the first data from the magnetic stripe or communicating the second data from the memory, wherein the number is displayed at the ATM.

In still further embodiments the device includes a clock mechanism that is configured to record a time, at which, each instance of reading the first data from the magnetic stripe or communicating the second data from the memory occurred.

Moreover, in additional specific embodiment the device is further configured to differentiate between authorized and unauthorized instances of the reading the first data from the magnetic stripe or the communicating the second data from the memory. In such embodiments of the device may be configured to record, in the magnetic stripe or in the memory, a registered identifier (i.e., fingerprint), such that, the registered identifier is communicated to the device from an authorized reader device in response to (i) reading the first data from the magnetic stripe at the authorized reader device or (ii) communicating the second data from the memory to the authorized reader device.

In still further specific embodiments of the device, the device is further configured, in response to determining that a threshold count has been met or exceeded within a predetermined period of time, initiate communication of an electronic alert to a user of the device. In other related embodiments of the device, the device is configured, in response to determining that a threshold count has been met or exceeded within a predetermined period of time, deactivate the device from conducting payment transactions.

A system for detecting unauthorized communication of data from a device defines second embodiments of the invention. The system includes a device having a card-like body and at least one of (i) a magnetic stripe, disposed on a facing of the card-like body, configured to store first data or (ii) an integrated circuit, embedded within the card-like body, having corresponding memory configured to store second data. The device is configured to count and record each instance of reading the first data from the magnetic stripe or communicating the second data from the memory. The system further includes a mobile communication terminal having a memory and at least one processor in communication with the memory. The mobile communication terminal includes a count display and control module that is stored in the memory and executable by the processor. The module is configured to receive, via short-range wireless communication, the number of instance of reading the first data from the magnetic stripe or communicating the second data from the memory and display the number on the mobile communication terminal.

In specific embodiments of the system, the count display and control module is further configured to reset counting at the device by communicating, via short-range wireless communication, a reset signal to the device. In other related embodiments of the system, the count display and control module is further configured to receive and display, on the mobile communication terminal, an alert that indicates that the device has met or exceeded, over a predetermined period of time, a predetermined number of instances of at least one of reading the first data from the magnetic stripe or communicating the second data from the memory.

A computer program product for detecting unauthorized communication of data from a card-like device including at least one of (i) a magnetic stripe, disposed on a facing of a body of the card-like device, configured to store first data or (ii) an integrated circuit, embedded within the card-like body, having corresponding memory configured to store second data defines third embodiments of the invention. The computer program product includes a non-transitory computer-readable storage medium having computer-executable instructions for counting and recording each instance of reading the first data from the magnetic stripe or communicating the second data from the memory.

In specific embodiments of the computer program product, the instructions further include instructions for differentiating between authorized and unauthorized instances of the reading the first data from the magnetic stripe or the communicating the second data from the memory.

Thus, devices, systems, and computer program products herein described in detail below provide for counting and recording, within a card device, of the number of instances in which the card device has either had data read from the magnetic stripe or data communicating from memory associated with a smart chip/embedded integrated circuit. In specific embodiments, the count information is subsequently communicated to the user of the card device so that the user is made aware of how many times a card was swiped or otherwise had data communicated therefrom. In further embodiments of the invention, differentiation is made between unauthorized card readings and unauthorized card readings and such information is communicated to the user, along with the count information, so that the user is made aware of which data readings were unauthorized readings of the data.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various device, systems, apparatus, methods, and computer program products are herein described for determining unauthorized communication of data from a card device. In this regard, according to the present invention, the card device is able to count and record the number of instances in which the card device has either been swiped at a magnetic card reader or communicated data via an embedded Integrated Circuit (IC) (i.e., a smart card device). In specific embodiments of the invention, the device is further configured to differentiate between authorized swipes/data communications and unauthorized data communications.

In specific embodiments of the invention, card devices equipped with an embedded IC device are able to detect instances in which data is read from the device (i.e., either instances in which the card is swiped or instances in which the card comes in contact with an electromagnetic field or other short-range wireless communication field so as to prompt a wireless communication protocol to transmit data. In other embodiments of the invention, the card device may be equipped with sensors that detect each instance that the card device has been swiped, or is inserted into a smart card reader.

In specific embodiments of the invention, the card device may be equipped with a display that is configured to display the number of instances in which the card device has either been swiped at a magnetic card reader or communicated data via the embedded IC. In other instances, the card device may implement short-range wireless communication, such as NFC or the like to communicate the number to a mobile communication device application that is configured to display the number to the user via the mobile communication device. In other embodiments of the invention, the recorded number of instances may be read, in response to the card device being presented at an Automated Teller Machine (ATM) and the number displayed at the ATM.

In further embodiments of the invention the card device is configured to differentiate between authorized/legitimate readings of data from the card device and unauthorized readings of data from the card device. In specific embodiment of the invention, such differentiation is accomplished by communicating from the authorized reading device a registered identification (i.e., fingerprint) at the time of the reading of the data that is stored in unison with the count information (e.g., time, location, and the like) associated with the reading of the data. In such embodiment, data being read by unregistered reading devices are deemed to be unauthorized readings of the data.

In additional embodiments of the invention, in which a predetermined number of counts have been recorded and, in some embodiments, over a predetermined time period, an alert may be electronically communicated to the user of the card device or the card device may be deactivated for a prescribed period of time or until further action is taken to re-activate the card device.

Thus, the present invention serves to improve a card device by adding security features that enable a user to have knowledge of each instance in which the card is read by a magnetic stripe reader or communicates data from memory associated with a smart chip (i.e., embedded IC). Additionally, the card device is improved by rendering security features that provide for informing the user of the card device as to which of the instances are authorized and which are unauthorized. Moreover, the card device is improved by adding security features that alert the user and/or de-active the card device based on occurrence, over a predetermined time period, of a predetermined number of instances in which the card is read by a magnetic stripe reader or communicates data from memory associated with a smart chip (i.e., embedded IC).

Figure 1A:
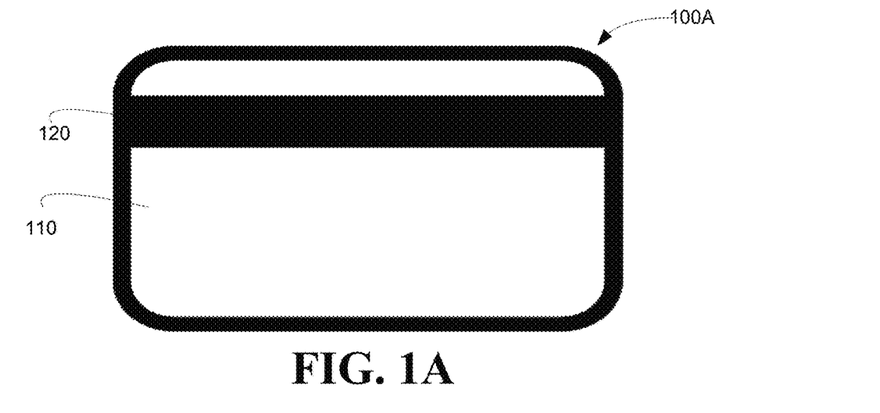
FIGS. 1A-1C provide a schematic diagrams of exemplary devices configured for detecting unauthorized communication of data from the device, in accordance with embodiments of the present invention.
Figure 1B:
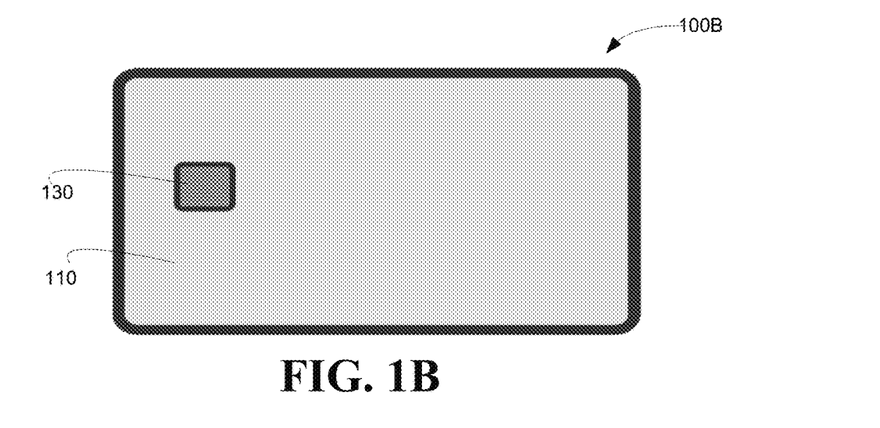
Figure 1C:
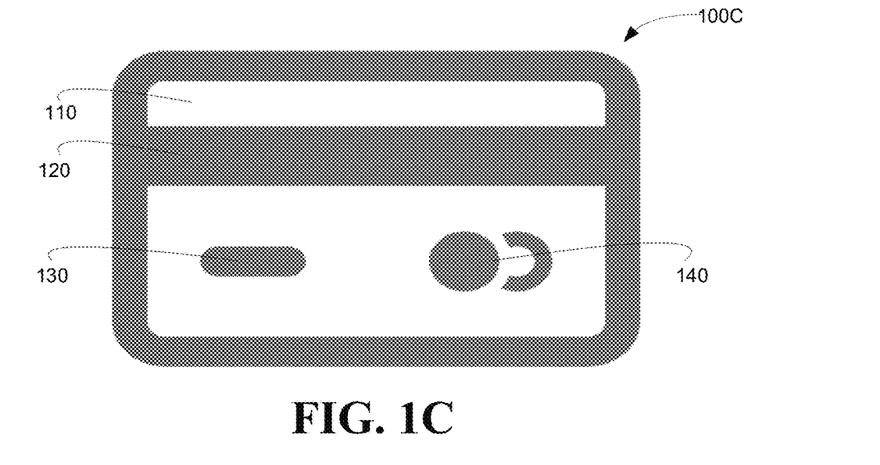
Figure 2:
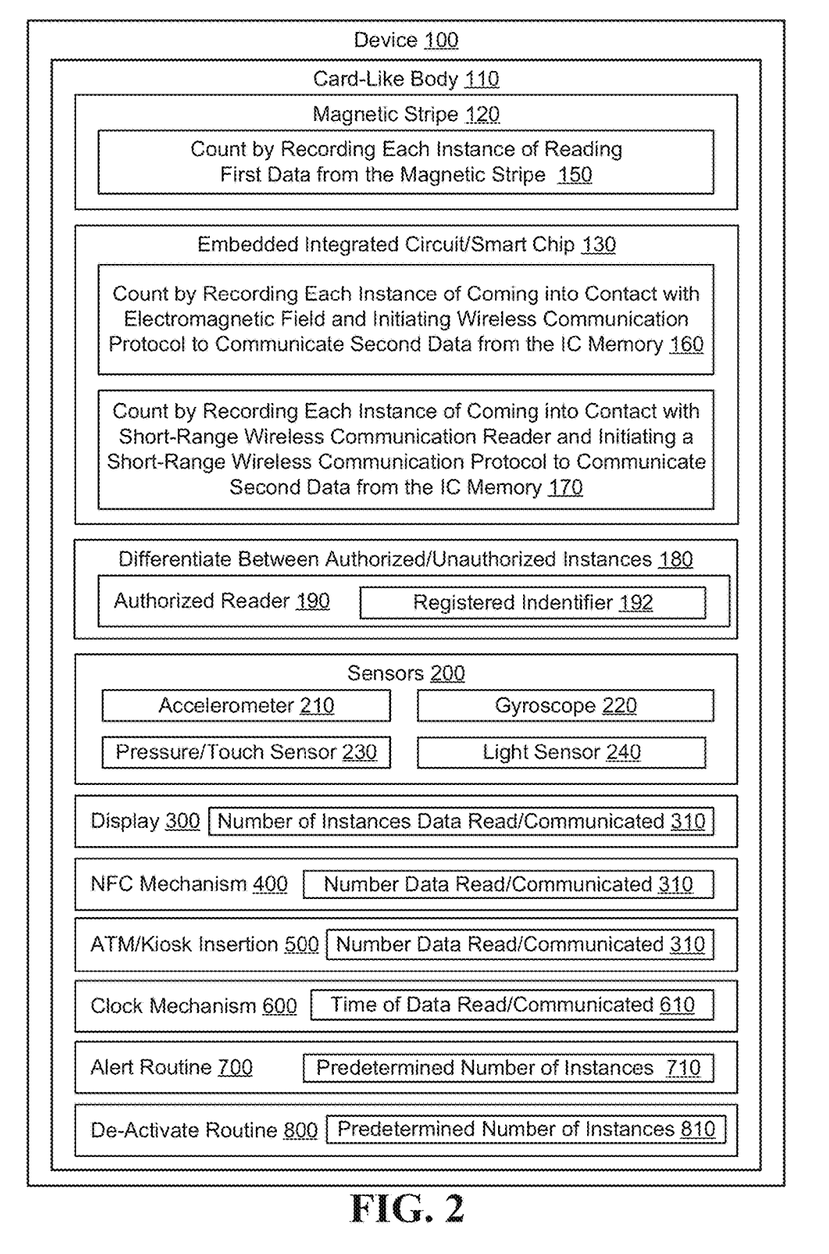
FIG. 2 provides a block diagram of an device configured for detecting unauthorized communication of data from the device, in accordance with embodiments of the present invention.

Referring to FIGS. 1A-AC, devices 100A-C are depicted that are configured for detecting unauthorized communication of data from the device, in accordance with embodiments of the present invention. The devices 100 comprise a card-like body 110, FIGS. 1A-1C show one facing, either the front facing or the back facing of the card-like body 110. FIG. 1A depicts device 100A having a magnetic stripe 120 disposed lengthwise across a facing of the card-like body 110. The magnetic stripe is configured to store data, herein referred to as first data, which can be read by a magnetic stripe reader device (commonly referred to as swiping the device 100A).

FIG. 1B depicts device 100B having an integrated circuit (IC) (e.g., microprocessor, also referred to as a smart chip) 130 embedded within the card-like body 110. In those embodiments in which the card-like body 110 is constructed of transparent materials, the IC 130 may be visible to the user, while in other embodiments in which the card-like body is not constructed of transparent materials, the IC may not be visible to the user. The IC 130 is associated with a corresponding memory, which store data, herein referred to as second data, which can be read/communicated to a smart card reader device or the like. The smart card reader, otherwise referred to as a dip reader, provides for inserting the device 100 into the reader at which point the device comes in contact with an electromagnetic field to power the card and a short-range wireless protocol, such as Radio Frequency Identification (RFID) or the like is initiated to transfer the second data from the device to the reader. In specific embodiments of the invention, the memory may be incorporated within the IC 130 or, in other embodiments of the invention, the memory may be a stand-alone component that is in communication with the IC 130 or the memory may be cloud-based memory accessible to the IC 130. According to embodiments of the present invention, the first data stored in the magnetic stripe 120 and the second data stored in the memory associated with IC 130 may be the same data or different data.

FIG. 1C depicts device 100C having both a magnetic stripe 120 and an integrated circuit 130. As previously discussed the magnetic stripe 120 is disposed lengthwise across a facing of the card-like body 110. The magnetic stripe is configured to store data, herein referred to as first data. The integrated circuit (e.g., microprocessor, also referred to as a smart chip) 130 is embedded within the card-like body 110. The IC 130 is associated with a corresponding memory, which store data, herein referred to as second data. First and second data may the same data or different data. Devices 100C having both a magnetic stripe 120 and an embedded IC 130 allow for data to read/communicated from the device by both a magnetic stripe reader device and/or a smart card reader device. In addition, device 100C includes a short-range wireless communication mechanism 140, such as NFC or the like, embedded within the card-like body 110, which provides for the second data, stored in the memory associated with the IC 130, to be read/communicated to a contactless short range wireless reader device.

In accordance with embodiments of the invention, the card device 100A-C is configured to count by recording each instance that the first data is read from the magnetic stripe 120 and/or the second data is communicated from the memory associated with the IC. In specific embodiments of the invention, the magnetic stripe 120 is configured with read/write capabilities, such that magnetic stripe records each instance in which the first data is read from the magnetic stripe (i.e., each instance of the card being swiped at a magnetic swipe reader). In other embodiments of the invention, in which the device 100 includes both a magnetic stripe 120 and IC 130, the memory associated with the IC 130 may be in further communication with the magnetic stripe 120, such that the memory records each instance in which the first data is read from the magnetic stripe.

In other specific embodiments of the invention, in which the card device includes an IC 130, the IC 130 is configured to count by recording, in the memory associated with the IC 130, each instance that the device comes into contact with an electromagnetic field (for the purpose of powering up the IC 130) and, subsequently, initiates a wireless communication protocol (such as, RFID or the like) to communicate data from the memory associated with the IC 130. In other specific embodiments of the invention, in which the card device includes an IC 130, the IC 130 is configured to count by recording, in the memory associated with the IC 130, each instance that the device comes into contact with a short-range wireless reader (e.g., each time the short-range wireless mechanism 140 in the device 100 is powered-up/awoken) and, subsequently, initiates a short range wireless protocol (NFC, Bluetooth® or the like) to communicate data from the memory associated with the IC 130

Figure 3:
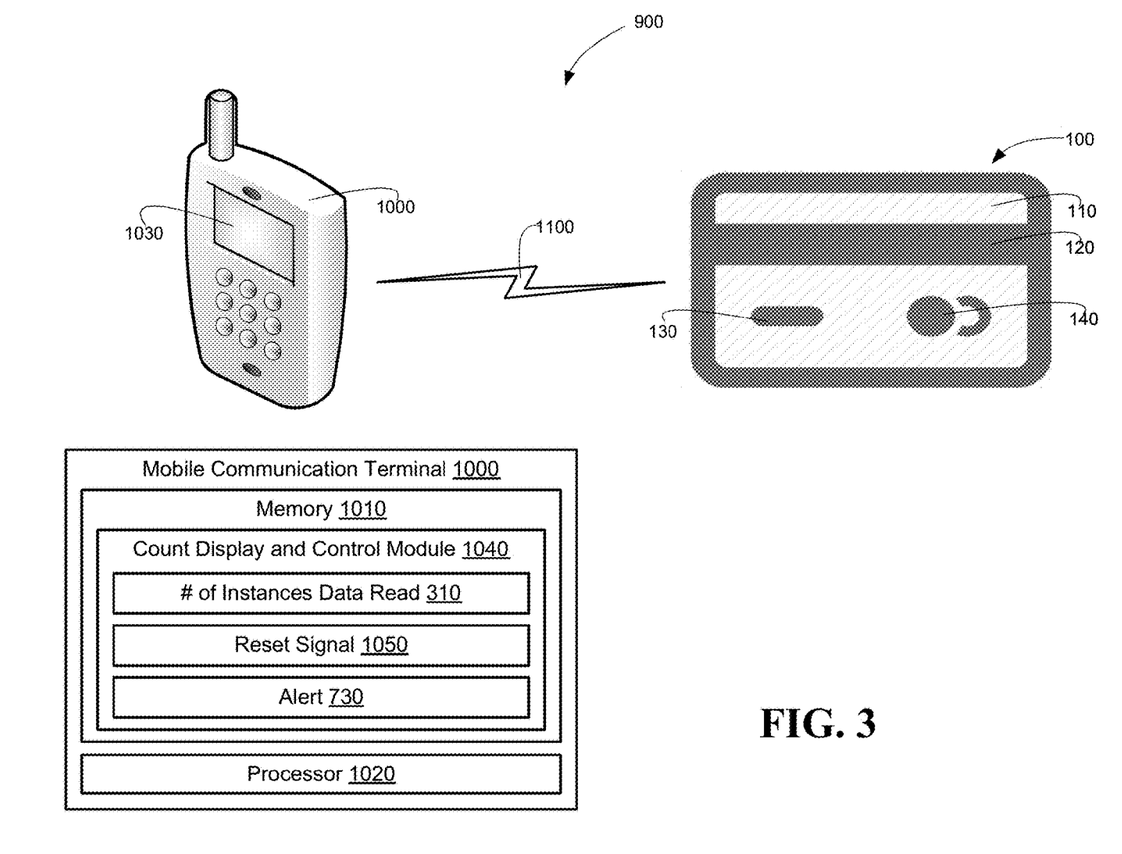
FIG. 3 provides a schematic diagram of a system configured for detecting and reporting unauthorized communication of data from the device, in accordance with embodiments of the present invention.

Referring to FIG. 3, a block diagram is present of a device 100 configured for detecting unauthorized communication of data from the device, in accordance with embodiments of the present invention. In addition to providing greater detail, FIG. 3 highlights various alternate embodiments of the invention. The device 100 may include any device having a card-like body 110 and at least one of (i) a magnetic stripe 120 disposed on a facing of the card-like body 110 that is configured to store first data (not shown in FIG. 3) and/or (ii) an integrated circuit 130, otherwise referred to as a microprocessor or smart chip, embedded in the card-like body 110 that is associated with a corresponding memory (not shown in FIG. 3) configured to store second data (not shown in FIG. 3). As previously noted, the memory may be included within the IC 130 or accessible to the IC 130. In addition the first and second data may be the same data or different data. In accordance with embodiments of the invention, the card device is configured to count by recording each instance of (i) reading the first data from the magnetic stripe and/or (ii) communicating the second data from the memory associated with/corresponding to the IC 130.

In specific embodiments of the invention, the magnetic stripe 120 is configured to count 150, by recording, in the magnetic stripe 120 or in the memory associated with the IC 130, each instance of reading the first data from the magnetic stripe (e.g., each time the card 100 is swiped in a magnetic stripe reading device).

In other embodiments of the invention, the IC 130 is configured to count 160, by recording, in the memory associated with the IC 130, each instance in which the device 100 comes in contact with an electromagnetic field (i.e., each time the IC is powered-up) and initiates a wireless communication protocol, such as RFID or the like, to communicate the second data from the memory associated with the IC 130. In other embodiments of the invention, the IC 130 is configured to count 170, by recording, in the memory associated with the IC 130, each instance in which the device 100 comes in contact with short-range wireless communication field, such as Near Field Communication (NFC) or the like, and initiates a short-range wireless communication protocol, such as NFC or the like, to communicate the second data from the memory associated with the IC 130.

In specific embodiments of the invention, device is further configured to differentiate 180 between authorized and unauthorized instances in which the (i) first data is read from the magnetic stripe 120, and/or (ii) the second data is communicated from the memory associated with the IC 130. In specific embodiments of the invention, differentiation between authorized and unauthorized instances is accomplished by recording, in the magnetic stripe 120 and/or the memory associated with the IC 130, a registered identifier 192, otherwise referred to as an "authenticating fingerprint", which is communicated to the device by an authorized reader device 190 (e.g., authorized magnetic stripe reader, smart card reader or short-range wireless reader) in response to (i) reading the first data from the magnetic stripe at an authorized reader device 190 and/or (ii) communicating the second data from the memory to the authorized reader device 190. In this regard, unauthorized reader devices (e.g., skimmer devices or the like) will not have the capability to communicate a registered identifier 192 and, thus, any instance of recording a reading/communication of first or send data which does not include a corresponding registered identifier 192 would be deemed to be an unauthorized reading or communication of the data.

In specific embodiments of the invention, the device 100 includes one or more sensors 200 that are configured to detect instances of when the device has (i) first data read from the magnetic stripe 120, and/or (ii) second data communicated from the memory associated with the IC 130. In specific embodiments of the invention, the sensors may include an accelerometer 210, a gyroscope 220, a pressure sensor 230 and a light sensor 240.

In specific embodiments of the invention, one or more sensors 200 are configured to detect the swiping of the device 100 and, specifically the swiping of the magnetic stripe 120, in a magnetic stripe reader. In such embodiments of the invention, the device may implement a swipe detection routine (not shown in FIG. 3) that is configured to detect that that the magnetic stripe 120 has been swiped by implementing one or more of (i) the accelerometer 210 to determine a requisite level of acceleration associated with the swiping motion, (ii) the gyroscope 220 to determine proper swipe orientation of the device 100 based on the location of the magnetic stripe 120 on the facing of the device 100, (iii) the pressure sensor 230 to determine a requisite level of pressure at the magnetic stripe 120 that is associated with the magnetic stripe contacting the magnetic stripe reader device, and (iv) a light sensor 240 to determine a requisite level of light (in other words, darkness) encountered by the device while being swiped thru a magnetic stripe reader device. In specific embodiments of the invention, the swipe detection routine implements more than one and, in some embodiments all of the aforementioned sensors 200, to determine/detect that the magnetic stripe 120 of the device 100 has been swiped thru a magnetic stripe reader device. Data analytics may be implemented to take into the readings of two or more of the sensors 200 to determine if a swipe of the magnetic stripe 120 has occurred.

In other embodiments of the invention, the device may implement an insertion detection routine (not shown in FIG. 3) that is configured to detect that that the device 100 has been inserted into a reader terminal (e.g., a smart device reader terminal or dip reader terminal) by implementing one or more of (i) the gyroscope to determine proper insertion orientation of the device 100 required by the reader terminal, (ii) the pressure sensor to determine a requisite level of pressure applied to the device while inserted into the reader terminal, and (iv) a light sensor to determine a requisite level of light (in other words, darkness) encountered by the device while inserted in the reader terminal. Since smart card reader devices typically require a prolonged insertion period, the requisite level of pressure and/or the requisite level of light may be required to occur over a predetermined period of time (i.e., the typically time in which the device is inserted into the reader terminal). In specific embodiments of the invention, the insertion detection routine implements more than one and, in some embodiments all of the aforementioned sensors 200, to determine/detect that the device 100 has been inserted into a reader terminal. In further embodiments of the invention, data analytics may be implemented to take into the readings of two or more of the sensors 200 to determine if an insertion has occurred.

In other embodiments of the invention, the device 100 has various means available for providing the number of instances in which the device 100 has been read and/or communicated the first and/or second data. In certain embodiments, the device includes a display 300 on a facing of the card-like body 110 that is configured to display the number 310 of instances in which the device 100 has been read and/or communicated the first and/or second data (i.e., the number of times the card 100 has been swiped, inserted in a card reader device and/or communicated data via short-range wireless protocol). In such embodiments, the counter shown in the display may be re-set (i.e., changed to a zero count) remotely, such as via a reset signal communicated via short range-wireless communication for a mobile terminal device (e.g., a user's smart telephone device or the like). In other embodiments of the invention, the device may include a short-range wireless communication mechanism, such as an NFC mechanism or the like that is configured to communicate the number 310 of instances in which the device 100 has been read and/or communicated the first and/or second data to a device equipped with a corresponding short-range wireless communication receiver, such as mobile communication terminal, which, in turn, is configured to display the number 310 of the device, e.g., display the number 310 on the user's mobile communication device.

In other embodiments of the invention, the device 100 is configured to, in response to inserting 500 the card 100 at an Automated teller Device (ATM) or some other kiosk device, display the number 310 of instances in which the device 100 has been read and/or communicated the first and/or second data at the ATM or kiosk. In such embodiments the insertion 500 of the card 100 in the ATM or kiosk, results in the ATM or kiosk reading the number 310 from the magnetic stripe 120 or the memory associated with the IC. Once the number 310 has been read from the device 100, the ATM or kiosk can display the number and any other relevant information to the user.

In further embodiments of the invention, the device 100 may include a clock mechanism 600, which is configured to record the time 610 at which the data was read and/at communicated. The time(s) 610 may be communicated to the user along with number 310 via the display 300, the mobile communication device and/or ATM/kiosk so that a user can deduce whether the readings/communications were authorized or unauthorized readings/communications.

In still further embodiments of the invention, the IC 130 of the card 100 is configured to initiate execution an alert routine 700 that is configured communicate an alert to the user in the event that a predetermined number 710 of instances of reading/communicating the data has occurred. In specific embodiments, the alert is initiated if the predetermined number (i.e., threshold count/number) 710 of instances of reading/communicating the data has occurred over a predetermined period of time (e.g., within an hour, a day or the like). The alert routine 700 may be stored and executed at the device 100, in which case the alert may be communicated to the user's mobile communication device, via short range wireless communication, such as NFC or the like. In other embodiments of the invention, the device may be configured to send an alert signal to a network-based alert routine 700 that subsequently generates and initiates wireless or cellular network communication of the alert to the user's mobile communication device.

In other specific embodiments of the invention, the IC 130 of the card 100 is configured to initiate execution a de-activation routine 800 that is configured de-activate the device 100 in the event that a predetermined number 810 of instances of reading/communicating the data has occurred. In specific embodiments, deactivation is initiated if the predetermined number (i.e., threshold count/number) 810 of instances of reading/communicating the data has occurred over a predetermined period of time (e.g., within an hour, a day or the like). The de-activation routine 800 may be stored and executed at the device 100 or, in other embodiments of the invention, the device may be configured to send a predetermined count signal to a network-based deactivation routine 800 that subsequently sends a network communication to the device 100 that deactivates the device 100.

Referring to FIG. 3 a system 900 is depicted for detecting and reporting unauthorized communication of data from a device, in accordance with embodiments of the present invention. The system includes a device 100 having a card-like body 110 and at least one of (i) a magnetic stripe 120, disposed on a facing of the card-like body 110, that is configured to store first data, and/or (ii) an integrated circuit (IC) 130, embedded within the card-like body 110 that is configured to store second data in memory associated with the IC 130. The device 100 is configured to count by recording each instance of (i) reading the first data from the magnetic stripe and/or (ii) communicating the second data from the memory associated with the IC 130. In optional embodiments, the device 100 may additionally include a short-range wireless communication mechanism 140 configured for communicating first and second data to a corresponding short-range wireless communication reader device and/or communicating (i) number 310 of instances of having first data read and/or second data communicated, and/or (ii) alert 710 that is configured to alert the user that a threshold number of instances of having first data read and/or second data communicated has occurred.

System 900 additionally includes mobile communication terminal 1000 that includes a memory 1010 and at least processor 1020 in communication with the memory 1010. Mobile communication terminal 1000 is in wireless communication 1100 with device 100 via a short-range wireless communication 1100 means, such as NFC, Bluetooth® or the like. Additionally, the memory 1010 of mobile communication terminal 1000 stores count display and control module 1020 that is configured to receive, via the short-range wireless communication 1110 means, such as NFC, Bluetooth® or the like the number 310 of instances of (i) reading the first data from the magnetic stripe and/or (ii) communicating the second data from the memory associated with the IC 130. In response to receiving the number 310, the count display and control module 1020 is configured to display the number 310 on the display 1030 of the mobile communication terminal 1000. In addition to displaying the number 310, the count display and control module 1020 may provide for displaying other information such as the number of authorized and/or unauthorized instances of (i) reading the first data from the magnetic stripe and/or (ii) communicating the second data from the memory and/or the time at which the instances occurred.

In further embodiments of system, the display and control module 1020 is further configured to receive a user input that is configured to generate and communicate, via the short-range wireless communication 1100 means, a reset signal 1040 to the device 100 that serves to reset the counter (e.g., set the counter to zero). In such embodiments of the system, in response to communicating the reset signal 1040, the display 1030 on the mobile communication device 1000 is changed to indicate a zero number of instances of (i) reading the first data from the magnetic stripe and/or (ii) communicating the second data from the memory.

In additional embodiments of the system, the display and control module 1020 is further configured to receive, via the short-range wireless communication 1100 means and/or the cellular or data network (e.g., Internet), an alert 730 that indicates that the device 100 has met or exceeded a predetermined number of instances of (i) reading the first data from the magnetic stripe and/or (ii) communicating the second data from the memory. In specific embodiments of the system, the alert is issued in response to a predetermined number of instances occurring over a predetermined period of time (e.g., within an hour, a day or the like). In such embodiments, in response to receiving the alert 730, the display 1030 on the mobile communication device 1000 is configured to display the alert 730 to the user.

Thus, devices, systems, and computer program products herein described in detail below provide for a counting and recording, within a card device, of the number of instances in which the card device has either had data read from the magnetic stripe or data communicating from memory associated with a smart chip/embedded integrated circuit. In specific embodiments, the count information is subsequently communicated to the user of the card device so that the user is made aware of how many times a card was swiped or otherwise had data communicated therefrom. In further embodiments of the invention, differentiation is made between unauthorized card readings and unauthorized card readings and such information is communicated to the user, along with the count information, so that the user is made aware of which data readings were unauthorized readings of the data. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A device configured for detecting unauthorized communication of data from the device, the device comprising:
    a card-like body;
    an integrated circuit, embedded within the card-like body, having corresponding memory configured to store user data;
    at least one sensor in communication with the integrated circuit and comprising one or more of a gyroscope, a pressure sensor and a light sensor; and
    an insertion detection routine stored in the memory, executable by the integrated circuit and configured to:
        detect that the device has been inserted into a reader terminal by implementing one or more of (i) the gyroscope to determine proper insertion orientation of the device into the reader terminal based on location of the integrated circuit, (ii) the pressure sensor to determine a requisite pressure applied to the device while inserted into the reader terminal, and (iii) the light sensor to determine a requisite level of light encountered by the device for a predetermined period of time while inserted into the reader terminal,
        count, by recording as first data in the memory, each detected instance of the device being inserted into a reader terminal.

2. The device of claim 1, wherein the integrated circuit is configured to:
    count, by recording as second data in the memory, each instance (a) the device coming into contact with an electromagnetic field, and (b) initiating a wireless communication protocol to communicate the second data from the memory.

3. The device of claim 1, wherein the integrated circuit is configured to:
    count, by recording as second data in the memory, each instance of (a) the device coming into contact with a short-range wireless communication reader, and (b) initiating a short-range wireless communication protocol to communicate the user data from the memory to the short-range wireless communication reader.

4. The device of claim 1, wherein the at least one sensor further comprises one or more of an accelerometer, the gyroscope, the pressure sensor and the light sensor and the device further comprises:
    a magnetic stripe disposed on a facing of the card-like body and configured to store third data;
    a swipe detection routine stored in the memory, executable by the integrated circuit and configured to:
        detect that the magnetic stripe has been swiped at a magnetic swipe reader by implementing one or more of (i) the accelerometer to determine a requisite level of acceleration associated with swiping, (ii) the gyroscope to determine proper swipe orientation of the device based on location of the magnetic stripe on the device, (iii) the pressure sensor to determine a requisite pressure at the magnetic stripe associated with swiping the device thru the magnetic stripe reader, and (iv) the light sensor to determine a requisite level of light encountered by the device while being swiped thru the magnetic stripe reader, and count, by recording as second data in the memory, each detected instance of the magnetic strip being swiped at a magnetic stripe reader.

5. The device of claim 1, further comprising a display, disposed on a facing of the card-like body, configured to display a number associated with detected instances of the device being inserted into a reader terminal.

6. The device of claim 1, further comprising at least one short-range wireless communication mechanism, wherein the short-range wireless communication mechanism is configured to communicate, to a mobile communication terminal, a number associated with detected instances of the device being inserted into a reader terminal.

7. The device of claim 1, wherein the device is configured to, upon being inserted into an Automated Teller Machine (ATM), be read, from the memory, a number associated with detected instances of the device being inserted into a reader terminal and, wherein the number is displayed at the ATM.

8. The device of claim 1, further comprising a clock mechanism, wherein the clock mechanism is configured to record a time, at which, each detected instance of the device being inserted into a reader terminal occurred.

9. The device of claim 1, wherein the device is further configured to differentiate between authorized and unauthorized instances of the device being inserted into a reader terminal.

10. The device of claim 9, wherein the device is configured to record, in the memory, a registered identifier, wherein the registered identifier is communicated to the device from an authorized reader terminal in response to communicating the user data from the memory to the authorized reader terminal.

11. The device of claim 1, wherein the device is further configured, in response to determining that a threshold count has been met or exceeded within a predetermined period of time, initiate communication of an electronic alert to a user of the device.

12. The device of claim 1, wherein the device is further configured, in response to determining that a threshold count has been met or exceeded within a predetermined period of time, deactivate the device from communicating the user data.

13. A system for detecting unauthorized communication of data from a device, the system comprising:
 a device including:
  a card-like body;
  an integrated circuit, embedded within the card-like body, having corresponding first memory configured to store user data;
  at least one sensor in communication with the integrated circuit and comprising one or more of a gyroscope, a pressure sensor and a light sensor; and
  an insertion detection routine stored in the memory, executable by the integrated circuit and configured to:
   detect that the device has been inserted into a reader terminal by implementing one or more of (i) the gyroscope to determine proper insertion orientation of the device into the reader terminal based on location of the integrated circuit, (ii) the pressure sensor to determine a requisite pressure applied to the device while inserted into the reader terminal, and (iii) the light sensor to determine a requisite level of light encountered by the device for a predetermined period of time while inserted into the reader terminal,
   count, by recording as first data in the memory, each detected instance of the device being inserted into a reader terminal;
   and
 a mobile communication terminal having a second memory, at least one processor in communication with the second memory, a display and control module, stored in the second memory, executable by the processor and configured to:
  receive, via short-range wireless communication, a number associated with detected instances of the device being inserted into a reader terminal, and
  display the number on the display of the mobile communication terminal.

14. The system of claim 13, wherein the control module is further configured to reset counting at the device by communicating, via short-range wireless communication, a reset signal to the device.

15. The system of claim 13, wherein the control module is further configured to receive and display, on the mobile communication terminal, an alert that indicates that the device has met or exceeded, over a predetermined period of time, a predetermined number of instances of the device being inserted into a reader terminal.

* * * * *